US011504807B2

United States Patent
Burbaum et al.

(10) Patent No.: US 11,504,807 B2
(45) Date of Patent: Nov. 22, 2022

(54) METHOD FOR JOINING A MODULAR HOT GAS COMPONENT USING WELDING AND HIGH-TEMPERATURE SOLDERING, AND JOINED COMPONENT

(71) Applicant: Siemens Energy Global GmbH & Co. KG, Bayern (DE)

(72) Inventors: Bernd Burbaum, Falkensee (DE); Torsten Jokisch, Neuenhagen bei Berlin (DE); Britta Stöhr, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/282,313

(22) PCT Filed: Sep. 13, 2019

(86) PCT No.: PCT/EP2019/074455
§ 371 (c)(1),
(2) Date: Apr. 1, 2021

(87) PCT Pub. No.: WO2020/074210
PCT Pub. Date: Apr. 16, 2020

(65) Prior Publication Data
US 2021/0379697 A1 Dec. 9, 2021

(30) Foreign Application Priority Data
Oct. 12, 2018 (DE) ...................... 10 2018 217 501.2

(51) Int. Cl.
*B23K 26/21* (2014.01)
*B23K 26/342* (2014.01)
(Continued)

(52) U.S. Cl.
CPC ............. *B23K 26/21* (2015.10); *B23K 1/0018* (2013.01); *B23K 26/342* (2015.10); *B23K 2101/001* (2018.08); *B33Y 80/00* (2014.12)

(58) Field of Classification Search
CPC ...... B23K 26/32; B23K 26/34; B23K 26/034; B23K 26/21; B23K 26/342; B23K 1/0018; B23K 2101/001; B33Y 80/00
See application file for complete search history.

(56) References Cited

U.S. PATENT DOCUMENTS

| 3,825,984 A | 7/1974 | Linko et al. |
| 7,057,132 B2 | 6/2006 | Beck et al. |

(Continued)

FOREIGN PATENT DOCUMENTS

| CN | 102615420 A | 8/2012 |
| CN | 104395027 A | 3/2015 |

(Continued)

OTHER PUBLICATIONS

PCT International Search Report and Written Opinion of International Searching Authority dated Dec. 12, 2019 corresponding to PCT International Application No. PCT/EP2019/074455 filed Sep. 13, 2019.

(Continued)

*Primary Examiner* — Moshe Wilensky
(74) *Attorney, Agent, or Firm* — Wolter Van Dyke Davis, PLLC

(57) ABSTRACT

A method for joining a modular hot gas component by welding and high-temperature soldering. In order to optimally join high-temperature components, a first component is plugged into pins of a second component, a soldering material is placed between the two components, and the pins of the second component are welded to the first component.

18 Claims, 1 Drawing Sheet

(51) Int. Cl.
  *B23K 1/00* (2006.01)
  *B33Y 80/00* (2015.01)
  *B23K 101/00* (2006.01)

(56) References Cited

U.S. PATENT DOCUMENTS

| | | |
|---|---|---|
| 2012/0237355 A1 | 9/2012 | Zhang et al. |
| 2013/0251513 A1 | 9/2013 | Stastny et al. |
| 2015/0071788 A1 | 3/2015 | Thompson et al. |
| 2015/0078905 A1 | 3/2015 | Albuzat et al. |
| 2017/0252844 A1 | 9/2017 | Hirono et al. |

FOREIGN PATENT DOCUMENTS

| | | |
|---|---|---|
| CN | 104420896 A | 3/2015 |
| CN | 205533644 U | 8/2016 |
| CN | 106604799 A | 4/2017 |
| CN | 107999981 A | 5/2018 |
| DE | 2309824 A1 | 9/1973 |
| DE | 102015200405 A1 | 7/2016 |
| DE | 102016214742 A1 | 2/2018 |
| DE | 102016218317 A1 | 6/2018 |
| EP | 1567291 A1 | 8/2005 |
| EP | 3385026 A1 | 10/2018 |
| EP | 3441573 A2 | 2/2019 |
| JP | S6082281 A | 5/1985 |

OTHER PUBLICATIONS

Mao, Wei et al: "Brazing Repair for Turbine Vane Pinholes of Д-30 Turbine Engine"; Aviation Maintenance & Engineering; No. 5, 49-50; with English machine translation of abstract attached.

METHOD FOR JOINING A MODULAR HOT GAS COMPONENT USING WELDING AND HIGH-TEMPERATURE SOLDERING, AND JOINED COMPONENT

CROSS REFERENCE TO RELATED APPLICATIONS

This application is the US National Stage of International Application No. PCT/EP2019/074455 filed 13 Sep. 2019, and claims the benefit thereof. The International Application claims the benefit of German Application No. DE 10 2018 217 501.2 filed 12 Oct. 2018. All of the applications are incorporated by reference herein in their entirety.

FIELD OF INVENTION

The invention relates to a method for joining a modular hot gas component by means of welding and to the joined component.

BACKGROUND OF INVENTION

The concept concerns the method for producing hot gas components, such as in particular stationary and moving turbine blades, from nickel-based superalloys. Various regions (segments) of the hot gas components, for example the airfoil, outer and inner platforms, are produced from materials optimized for this. For example, the tip of a turbine blade should be produced from materials that are more resistant to oxidation and corrosion in comparison with the root or the airfoil of the blade. The separately produced segments must therefore be metallurgically connected to one another by suitable production technologies.

A suitable production method is a combination of laser beam welding and high-temperature soldering.

In the case of this notification of invention, no complicated devices are necessary for adequate positioning of the segments in relation to one another.

SUMMARY OF INVENTION

The object of the invention is therefore to solve the aforementioned problem.

The object is achieved by a method and a component according to the independent claims.

The subclaims list further advantageous measures, which can be combined with one another in any way desired to achieve further advantages.

DETAILED DESCRIPTION OF INVENTION

The description and the figures only represent exemplary embodiments of the invention.

Proposed is a joining method for hot gas components, such as in particular for stationary and moving turbine blades, of nickel-based superalloys, only discussed by way of example for these components.

In this case, the various components of the hot gas components, for example the airfoil, outer and inner platforms, are produced from materials optimized for this and by production methods suitable for this, for example production by casting techniques, selective laser melting.

This is performed in two steps: the positive joining of the outer platforms and the airfoil is performed by means of pins on the airfoil and bores in the outer platform in four steps. A solder material is introduced between the airfoil and the platform in the form of a film or by means of laser beam build-up welding. The pins with an advantageous diameter of 20 mm-30 mm are advantageously provided with bores with an advantageous diameter=3 mm-5 mm and advantageously have a depth of 30 mm-50 mm.

1. By means of defocused laser radiation and adapted laser power, the pins are individually preheated to 773K-1073K. As a result, compressive stresses between the platform 10 and the airfoil 7 are achieved and the components 7, 10 cannot be displaced in relation to one another during the later joining process.

2. The preheating is controlled to a constant value by means of a (for example optical) temperature measurement and the solder 16 advantageously does not melt.

3. Laser beam welding is performed in particular with single-mode laser radiation in the preheated state, whereby a reduction of the susceptibility to hot cracking of the nickel-based superalloy is obtained and moreover no tacking is necessary as preparation for the welding process.

4. High-temperature soldering of the component.
Advantages are:
Components for highest thermal-mechanical stresses
High-temperature soldering possible without a complicated device.

Figure 1:
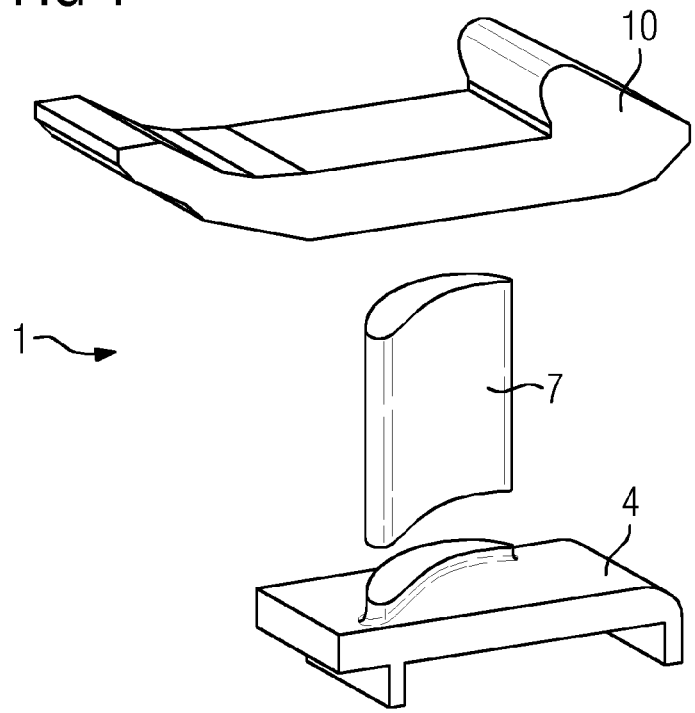
FIGS. 1 and 2 schematically show the invention.

FIG. 1 shows a component 1 by way of example, which is constructed from two or more parts 4, 7, 10 that are to be joined together.

In this example it is a stationary blade, but may also take the form of a moving blade or generally a component in which two components are to be joined to one another.

In the case of this component 1 of a moving turbine blade, it has an airfoil 7 and lower and upper blade platforms 4, 10, which platforms 4, 10 are formed in particular flat in the joining region (here for example the stump of the airfoil on the platform 4). The two outer solid platforms 4, 10 may be produced by means of a conventional precision casting technique or an additive manufacturing method such as SLS or SLM. A comparable situation applies to the airfoil 7.

Figure 2:
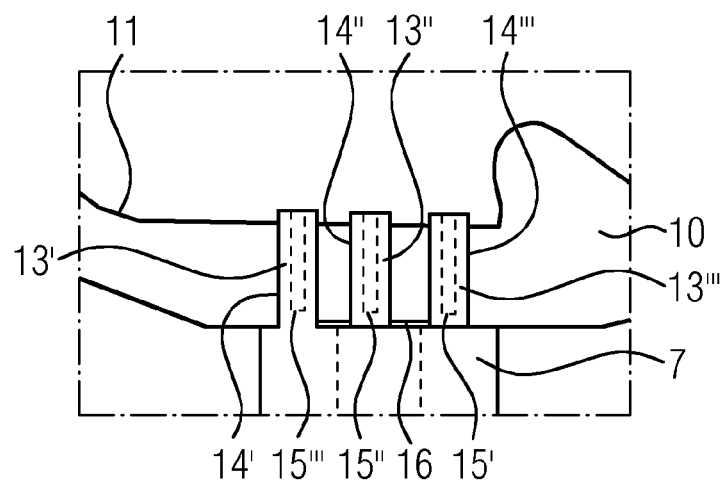

In FIG. 2 it is shown more specifically how two components 7, 10 are joined to one another.

The airfoil 7 or the component 7 has at least one pin, in particular three pins 13', 13", 13''', which can be inserted in or through corresponding openings 14', 14", 14''' in the second component 10, the outer blade platform 10.

On the contact surface between the first component 7 and the second component 10 (=joining region), here the airfoil 7 and the blade platform 10, there is a solder material, in particular a film or solder material that has been applied by means of laser build-up welding. The two components 7, 10 are then fitted one in the other in such a way that the solder material 16 is then present between them.

The pins 13', 13", 13''' are heated to correspondingly high temperatures, in particular of 773K-1073K, to achieve a stress between the pins 13', 13", 13''' and the blade platform 10, so that they are prestressed.

Then, the pins 13, 13" of the first component 7 are welded to the second component, so that there is a firm connection.

After that, high-temperature soldering of the component 1 takes place in a furnace, which can take a number of such components.

The invention claimed is:

1. A method for joining at least two components, wherein at least one component has at least one hole for corresponding pins of an other component, the method comprising:
    inserting the pins into or through the at least one hole, wherein the pins are accessible on or from an other side of the at least one component,
    applying a solder material in advance between the components in a joining region,
    preheating of the pins in advance so that the components are held firmly in relation to one another by a compressive stress,
    welding of the pins on the other side, so that the components are firmly connected to one another, and
    in a final process, high-temperature soldering of the components.

2. The method as claimed in claim 1, wherein the solder material takes the form of a film.

3. The method as claimed in claim 1, wherein the solder material has been applied by laser build-up welding.

4. The method as claimed in claim 1, wherein laser beam welding, is used for the welding.

5. The method as claimed in claim 1, wherein the at least one component has been or is produced by an additive manufacturing method.

6. The method as claimed in claim 1, wherein the components have been or are produced by various production methods.

7. The method as claimed in claim 1, wherein the pins are formed in one piece with the other component.

8. The method as claimed in claim 1, wherein the pins have a bore.

9. The method as claimed in claim 1, wherein the pins have a diameter of 2 cm to 3 cm.

10. The method as claimed in claim 1, wherein the bores have a depth of 30 mm-50 mm.

11. The method as claimed in claim 1, wherein the at least one component is formed flat in the joining region.

12. The method as claimed in claim 1, wherein the preheating of the pins comprises preheating to 773K-1073K.

13. The method as claimed in claim 1, wherein the preheating of the pins comprises preheating by a laser.

14. The method as claimed in claim 1, wherein the final process comprises a batch process.

15. The method as claimed in claim 4, wherein laser beam welding in single mode is used for the welding.

16. The method as claimed in claim 6, wherein the components have been or are produced by a casting technique and additive manufacturing methods.

17. The method as claimed in claim 8, wherein the pins have a bore with a diameter of 3 mm to 5 mm.

18. The method as claimed in claim 1, wherein the components comprise a first component and a second component, each having at least one hole for corresponding pins of an intermediate component joined between.

* * * * *